(12) United States Patent
Osawa

(10) Patent No.: US 8,831,414 B2
(45) Date of Patent: Sep. 9, 2014

(54) IMAGING APPARATUS, LIGHT EMITTING DEVICE, IMAGING SYSTEM, AND CONTROL METHOD

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/474,427

(22) Filed: May 17, 2012

(65) Prior Publication Data

US 2012/0294600 A1   Nov. 22, 2012

(30) Foreign Application Priority Data

May 20, 2011 (JP) ................. 2011-113911

(51) Int. Cl.
*G03B 15/00* (2006.01)
*G03B 7/08* (2014.01)
*G03B 15/05* (2006.01)
*H04N 5/232* (2006.01)
*H04N 5/235* (2006.01)

(52) U.S. Cl.
CPC *G03B 15/05* (2013.01); *G03B 7/08* (2013.01); *H04N 5/23212* (2013.01); *H04N 5/2354* (2013.01); *H04N 5/23203* (2013.01)
USPC ............................................................ 396/3

(58) Field of Classification Search
USPC .................................................... 396/3, 164
See application file for complete search history.

(56) References Cited

U.S. PATENT DOCUMENTS

2005/0213957 A1 *  9/2005  Tokunaga ................. 396/61
2007/0031060 A1 *  2/2007  Okada ...................... 382/274

FOREIGN PATENT DOCUMENTS

JP          2005-275265 A      10/2005

* cited by examiner

*Primary Examiner* — Clayton E Laballe
*Assistant Examiner* — Noam Reisner
(74) *Attorney, Agent, or Firm* — Canon U.S.A., Inc. IP Division

(57) ABSTRACT

An imaging apparatus including a light emitting device includes a determination unit configured to determine a weighting coefficient of each of a plurality of light metering regions, a calculation unit configured to calculate an amount of main flash light of the light emitting device after performing weighting of the light metering value of each of the plurality of light metering regions according to the weighting coefficient determined by the determination unit, and a selection unit configured to select, from the plurality of light metering regions, a reference region which is used when the weighting coefficient of each of the plurality of light metering regions is determined by the determination unit, and the selection unit selects the reference region in such a manner that a light metering region different from a light metering region whose color information acquired by the color information acquisition unit satisfies a particular condition, is preferentially selected.

19 Claims, 11 Drawing Sheets

FIG. 3A

| PD1 | PD2 | PD3 | PD4 | PD5 | PD6 | PD7 |
|---|---|---|---|---|---|---|
| PD8 | PD9 | PD10 | PD 11 | PD12 | PD13 | PD14 |
| PD15 | PD16 | PD17 | PD18 | PD19 | PD20 | PD21 |
| PD22 | PD23 | PD24 | PD25 | PD26 | PD27 | PD28 |
| PD29 | PD30 | PD31 | PD32 | PD33 | PD34 | PD35 |

| B | G | R | B | G | R | B | G | R |
|---|---|---|---|---|---|---|---|---|
| B | G | R | B | G | R | B | G | R |
| B | G | R | B | G | R | B | G | R |
| B | G | R | B | G | R | B | G | R |
| B | G | R | B | G | R | B | G | R |
| B | G | R | B | G | R | B | G | R |

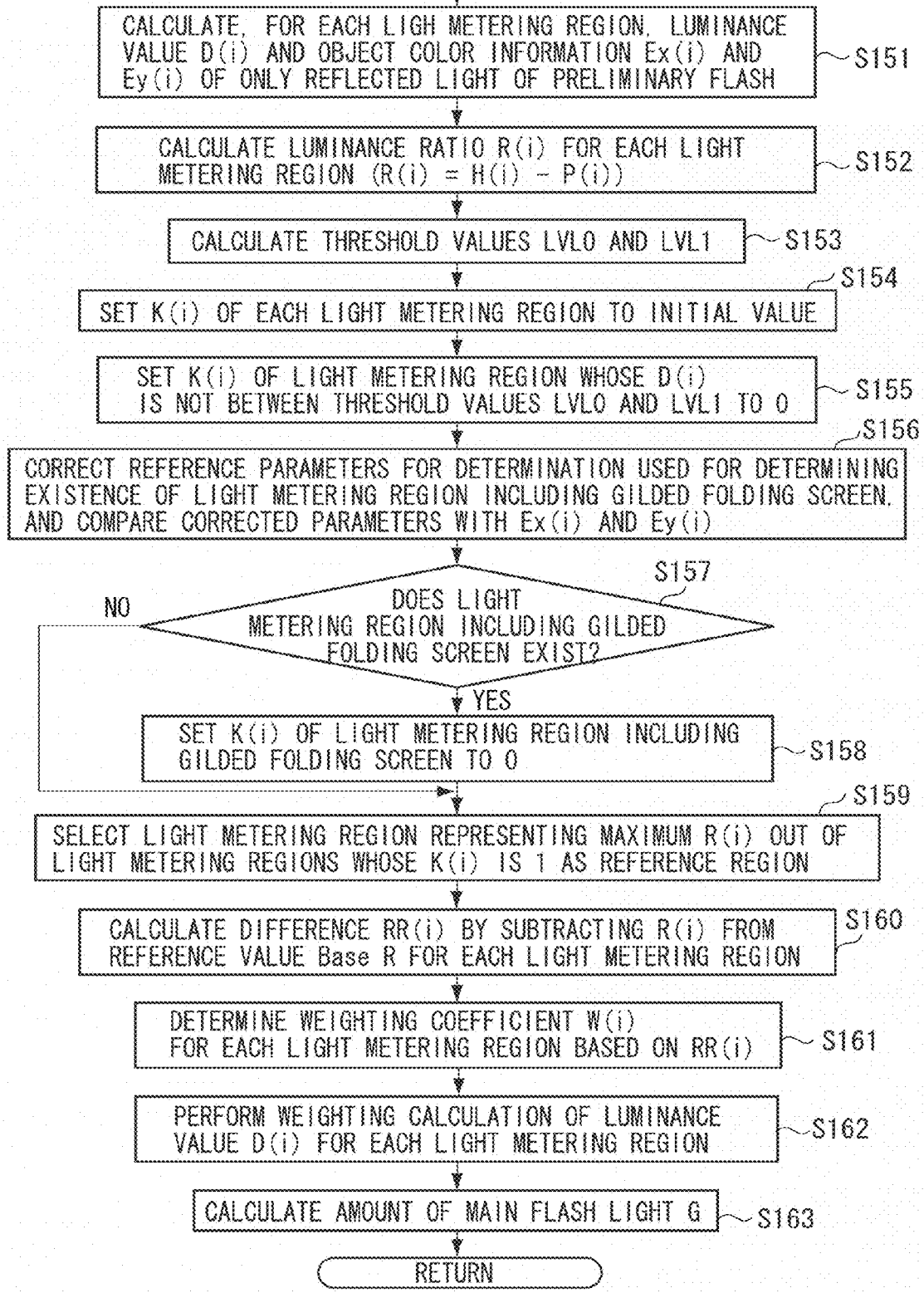

FIG. 7A

| K(1) | K(2) | K(3) | K(4) | K(5) | K(6) | K(7) |
|------|------|------|------|------|------|------|
| K(8) | K(9) | K(10) | K(11) | K(12) | K(13) | K(14) |
| K(15) | K(16) | K(17) | K(18) | K(19) | K(20) | K(21) |
| K(22) | K(23) | K(24) | K(25) | K(26) | K(27) | K(28) |
| K(29) | K(30) | K(31) | K(32) | K(33) | K(34) | K(35) |

FIG. 7B

| 0 | 0 | 0 | 0 | 0 | 0 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |

| 0 | 0 | 0 | 0 | 0 | 0 | 0 |
|---|---|---|---|---|---|---|
| 0 | 0 | 1 | 0 | 1 | 0 | 0 |
| 0 | 0 | 1 | 0 | 1 | 0 | 0 |
| 0 | 0 | 1 | 1 | 1 | 0 | 0 |
| 0 | 1 | 1 | 1 | 1 | 1 | 0 |

FIG. 8

TABLE 1

| FOCAL LENGTH (f) | LVL0 |
|---|---|
| f < 40 mm | LUMINANCE VALUE OF REFLECTED LIGHT WHEN OBJECT OF STANDARD REFLECTANCE IS AT DISTANCE OF 0.5m |
| 40 mm ≤ f < 75 mm | LUMINANCE VALUE OF REFLECTED LIGHT WHEN OBJECT OF STANDARD REFLECTANCE IS AT DISTANCE OF 0.8m |
| 75 mm ≤ f < 100 mm | LUMINANCE VALUE OF REFLECTED LIGHT WHEN OBJECT OF STANDARD REFLECTANCE IS AT DISTANCE OF 1.1m |
| 100 mm ≤ f | LUMINANCE VALUE OF REFLECTED LIGHT WHEN OBJECT OF STANDARD REFLECTANCE IS AT DISTANCE OF 1.4m |

FIG. 9

TABLE 2

| RR(i) | W(i) |
|---|---|
| RR(i) < -2 | 1 |
| -2 ≤ RR(i) < -0.5 | 5 |
| -0.5 ≤ RR(i) < 0 | 10 |
| 0 ≤ RR(i) < 0.2 | 12 |
| 0.2 ≤ RR(i) < 0.4 | 11 |
| 0.4 ≤ RR(i) < 0.6 | 10 |
| 0.6 ≤ RR(i) < 0.8 | 8 |
| 0.8 ≤ RR(i) < 1.0 | 6 |
| 1.0 ≤ RR(i) < 1.5 | 4 |
| 1.5 ≤ RR(i) < 2.0 | 2 |
| 2.0 ≤ RR(i) | 0 |

FIG. 10

| PARAMETER | |
|---|---|
| Exmin | STANDARD MINIMUM VALUE OF EX(i) OF LIGHT METERING REGION INCLUDING GILDED FOLDING SCREEN |
| Exmax | STANDARD MAXIMUM VALUE OF EX(i) OF LIGHT METERING REGION INCLUDING GILDED FOLDING SCREEN |
| Eymin | STANDARD MINIMUM VALUE OF EY(i) OF LIGHT METERING REGION INCLUDING GILDED FOLDING SCREEN |
| Eymax | STANDARD MAXIMUM VALUE OF EY(i) OF LIGHT METERING REGION INCLUDING GILDED FOLDING SCREEN |

IMAGING APPARATUS, LIGHT EMITTING DEVICE, IMAGING SYSTEM, AND CONTROL METHOD

BACKGROUND OF THE INVENTION

1. Field of the Invention

The present invention relates to a control of an amount of flash light when imaging using a light emitting device is performed.

2. Description of the Related Art

In taking an image of an object by flash imaging using a light emitting device, there is a method that determines an amount of flash light by executing preliminary flash. According to this method, the preliminary flash is executed by using the light emitting device before the main imaging and the amount of light reflected from the object is obtained. Then, the amount of flash light of the main imaging is calculated based on the reflected light acquired at the preliminary flash. For example, Japanese Patent Application Laid-Open No. 2005-275265 discusses a method for determining an amount of flash light according to the calculation described below.

First, a ratio $R(i)$ of a luminance value $H(i)$ at the preliminary flash for each of the light metering areas $A0$ to $A22$ to an object luminance value $P(i)$ just before the preliminary flash for each of light metering areas $A0$ to $A22$ are calculated.

Next, the greatest value of the ratios $R(i)$ of the light metering areas $A0$ to $A22$ is extracted as a reference value baseR. The light metering areas, which are used as target areas when the light metering area whose ratio $R(i)$ is the reference value baseR is extracted, are the light metering areas whose reflected amount of light is between threshold values $LVL0$ and $LVL1$ which are set according to a distance to the object at the preliminary flash.

Further, in determining the light metering areas which are used as target areas when the light metering area whose ratio $R(i)$ is the reference value baseR is extracted, if a mounted lens unit has a distance encoder, the threshold values $LVL0$ and $LVL1$ are set based on the information obtained from the distance encoder. If a mounted lens unit does not have a distance encoder, the threshold values $LVL0$ and $LVL1$ are set according to a distance determined according to past experience.

The extracted reference value baseR and the ratio $R(i)$ of each of the light metering areas $A0$ to $A22$ are compared and a weighting coefficient $W(i)$ of each of the light metering areas $A0$ to $A22$ is obtained. By using the obtained weighting coefficient $W(i)$, a weighting calculation of the reflected light of the object is performed. Further, by using the result of the weighting calculation, the amount of flash light when imaging is performed is calculated.

According to the method discussed in Japanese Patent Application Laid-Open No. 2005-275265, stable exposure is obtained in many scenes. Further, imaging results of small exposure variance can be obtained when imaging of a same scene but with a slightly different composition is performed.

However, since the weighting coefficient $W(i)$ is increased based on a main object area, which is a light metering area that satisfies predetermined conditions and whose $R(i)$ is the largest, if the object is located at a comparatively short distance or if an item with a high reflectivity is included in the imaging screen, the weighting coefficient $W(i)$ may be increased.

For example, if a highly-reflective object, such as a gilded folding screen, is included in the imaging screen, and further, if the accuracy of the distance encoder information obtained from the distance encoder mounted on the lens unit is not high or the distance is determined according to past experience because the lens unit does not have a distance encoder, the light metering area including the gilded folding screen is regarded as the main object area. In such a case, since the weighting coefficient $W(i)$ of the light metering area including the gilded folding screen is increased when the amount of flashlight is calculated, the amount of flash light may not be sufficient for the imaging of the main object, resulting in underexposure.

SUMMARY OF THE INVENTION

According to an aspect of the present invention, an imaging apparatus capable of imaging using a light emitting device includes a light metering value acquisition unit configured to acquire a plurality of light metering values corresponding to each of a plurality of light metering regions, a color information acquisition unit configured to acquire a plurality of pieces of color information corresponding to each of the plurality of light metering regions, a determination unit configured to determine a weighting coefficient of each of the plurality of light metering regions, a calculation unit configured to calculate an amount of main flash light after performing weighting of the light metering value of each of the plurality of light metering regions according to the weighting coefficient determined by the determination unit, and a selection unit configured to select, from the plurality of light metering regions, a reference region which is used when the weighting coefficient of each of the plurality of light metering regions is determined by the determination unit, wherein the selection unit selects the reference region in such a manner that a light metering region different from a light metering region whose color information acquired by the color information acquisition unit satisfies a particular condition is preferentially selected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate configuration examples of a light metering sensor.

FIG. 6 is a flowchart illustrating calculation processing of an amount of main flash light.

FIGS. 7A to 7D illustrate light metering areas from which a light metering area including a main object is selected.

FIG. 8 is a table used for determining a threshold value $LVL0$.

FIG. 9 is a table used for determining a weighting coefficient $W(i)$.

FIG. 10 illustrates determination reference parameters used for determining an area including a gilded folding screen.

DESCRIPTION OF THE EMBODIMENTS

Various exemplary embodiments, features, and aspects of the invention will be described in detail below with reference to the drawings.

Figure 1:
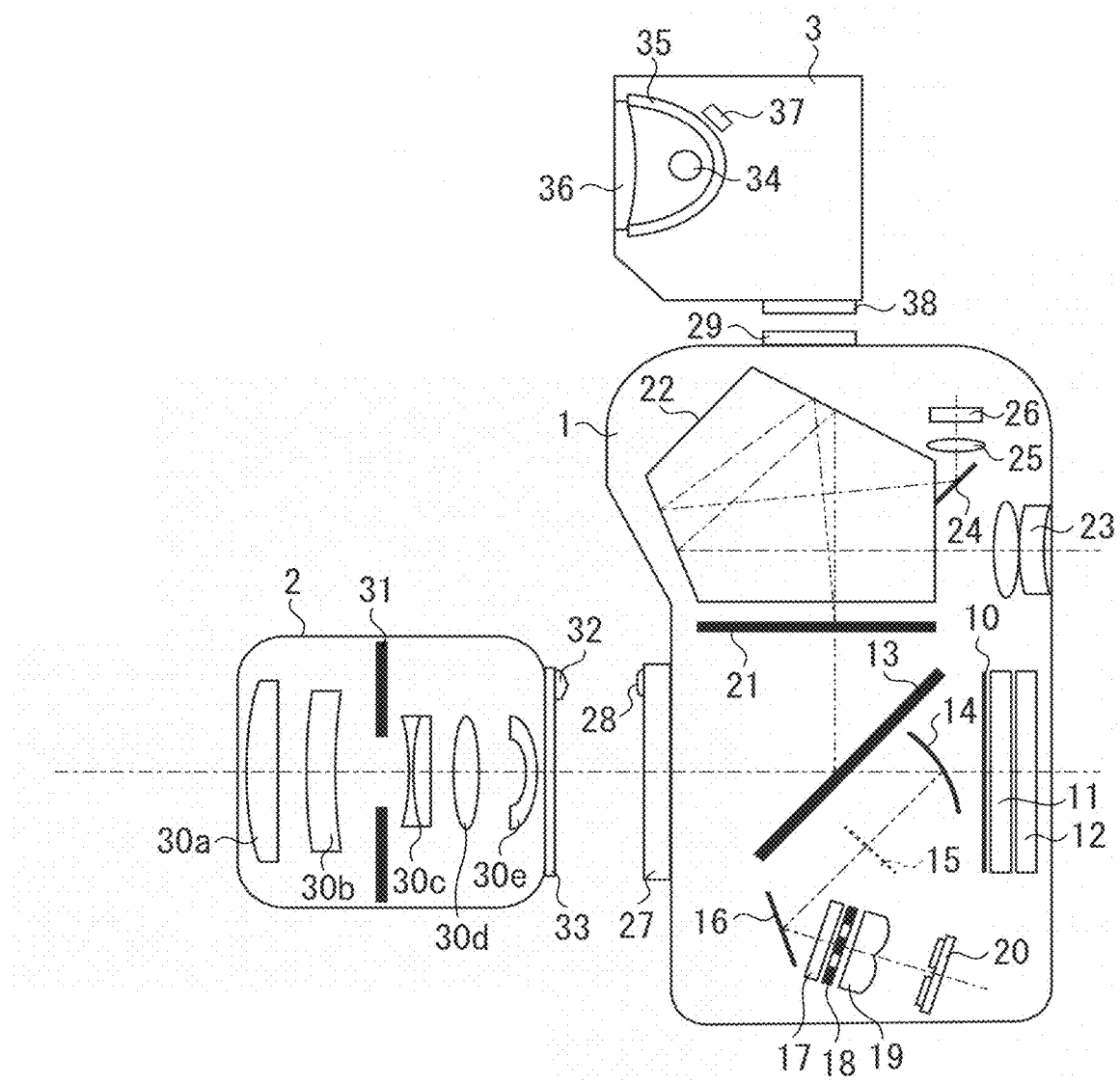
FIG. 1 is a cross sectional view of a camera, an interchangeable lens unit, and a flash unit according to an exemplary embodiment of the present invention.

FIG. 1 is a cross sectional view of an imaging system including a camera as an imaging apparatus, an interchangeable lens unit, and a flash unit as a light emitting device according to an exemplary embodiment of the present invention. Although an interchangeable-lens camera called a single-lens reflex type camera lens is illustrated in FIG. 1, an all-in-one camera can also be used.

Additionally, although a flash unit as a light emitting device is removable from the camera main body in the following description, a flash unit built in the camera main body (a built-in flash unit) can also be used.

A camera main body 1 includes a shutter 10, which is a mechanical shutter, an optical low pass filter 11, and an image sensor 12. The image sensor includes an area type charge storage type photoelectric conversion element and is, for example, a complementary metal oxide semiconductor (CMOS) sensor or a charge-coupled device (CCD) sensor.

Both a main mirror 13, which is partially transmissive, and a first reflection mirror 14 flip up at the time of imaging. The light reflected from the first reflection mirror 14 is guided to a focus detection sensor 20 via a paraxial imaging plane 15 located at a position conjugate, by the first reflection mirror 14, with an image sensor surface, a second reflection mirror 16, an infrared cut filter 17, a diaphragm 18 including two apertures, and a secondary imaging lens 19.

Figure 2:
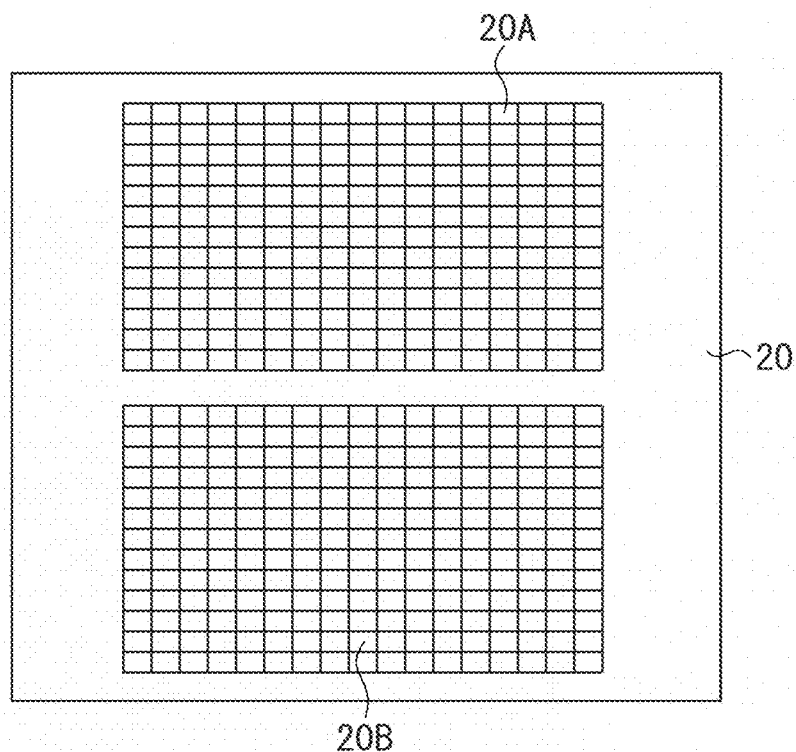
FIG. 2 illustrates a configuration example of a focus detection sensor.

The focus detection sensor 20 includes, for example, an area type charge storage type photoelectric conversion element such as a CMOS sensor or a CCD sensor. Corresponding to the two apertures of the diaphragm 18, the light-receiving sensor unit is divided into a pair of areas 20A and 20B each of which includes a plurality of blocks as illustrated in FIG. 2. According to the configuration of the camera main body 1 from the first reflection mirror 14 to the focus detection sensor 20, the focus can be detected using a phase difference detection system at an arbitrary location in the imaging screen.

A part of the light beams reflected by the main mirror 13 is guided to an eyepiece lens 23 via a focusing glass 21 having light diffusion properties and a pentaprism 22. The rest of the light beams are guided further to a light metering sensor 26 via a third reflection mirror 24 and a condenser lens 25. The light metering sensor 26 obtains luminance information of the object.

The light metering sensor 26 includes, for example, an area type charge storage type photoelectric conversion element such as a CMOS sensor or a CCD sensor. As illustrated in FIG. 3A, the light metering sensor 26 outputs a signal corresponding to each of the divided areas of the imaging screen for the object.

In the following description, a light metering value based on a signal output from the light metering sensor 26 is also referred to as luminance information, and information of color based on a signal output from the light metering sensor 26 is also referred to as color information.

According to the present exemplary embodiment, the imaging screen is divided into 35 (7×5) areas, and these areas are called light metering regions PD1 to PD35.

Each of the light metering regions PD1 to PD35 is further divided into small light-receiving pixels as illustrated in FIG. 3B. Color filters are attached to the light-receiving pixels in a certain arrangement. In FIG. 3B, color filters of primary colors (red (R), green (G), and blue (B)) are arranged in stripes.

Further, the camera main body 1 includes a mount unit 27 used for mounting the lens unit, a contact unit 28 used for communication with the mounted lens unit, and a connection unit 29 used for mounting a flash unit 3.

A interchangeable lens unit 2 includes optical lenses 30a to 30e that configure an imaging lens, a diaphragm 31, a contact unit 32 used for information communication with the camera main body 1, and a mount unit 33 by which the interchangeable lens unit 2 is mounted on the camera main body 1.

The flash unit 3 includes a light emitting unit 34 having a Xenon tube as a light source, a light reflector 35, a Fresnel lens 36 for condensing the light beam, a monitor sensor 37 configured to monitor an amount of flash light emitted from the light emitting unit 34, and a mount unit 38 used for mounting the flash unit 3 on the camera main body 1.

Figure 4:
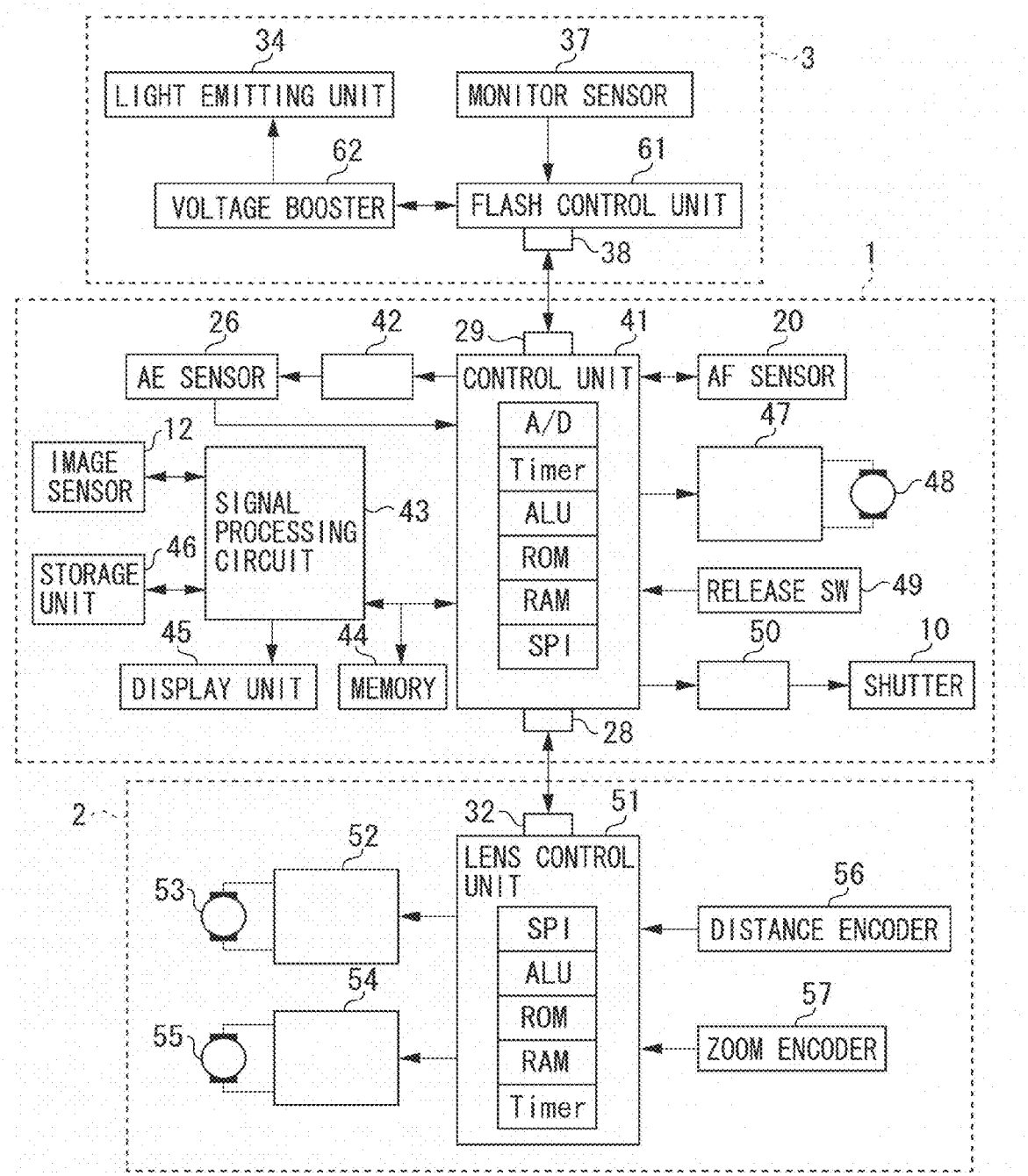
FIG. 4 is a block diagram illustrating electric circuits of a camera main body, an interchangeable lens unit, and a flash unit.

FIG. 4 is a block diagram illustrating a configuration example of electric circuits of the camera main body 1, the interchangeable lens unit 2, and the flash unit 3 according to the present embodiment.

The camera main body 1 includes a control unit 41 which performs overall control of the camera main body 1. The control unit 41 is a single chip microcomputer including an arithmetic logic unit (ALU), a read-only memory (ROM), a random access memory (RAM), an analog-to-digital (A/D) converter, a timer, and a serial communication port (SPI). A control flow of the control unit 41 will be described below.

Signals output from the focus detection sensor (autofocus (AF) sensor) 20 and the light metering sensor (AE sensor) 26 are input in an A/D converter input terminal of the control unit 41. A timing generator 42 generates a timing signal, which is used when signals are stored in or read out from the light metering sensor 26.

According to an instruction from the control unit 41, a signal processing circuit 43 performs A/D conversion of an imaging signal output from the image sensor 12. Accordingly, an image signal is obtained. Before the obtained image signal is stored, the image signal is subjected to image processing such as compression.

A memory 44 is, for example, a DRAM and is used as a work memory when the signal processing circuit 43 performs various types of signal processing. The memory 44 is also used as a video RAM (VRAM) which is used when an image is displayed on a display unit 45 described below.

The display unit 45 includes a liquid crystal panel and, according to a control by the control unit 41, displays various types of imaging information and captured images. A storage unit 46, which is a flash memory, an optical disk, or the like, receives a signal of a captured image from the signal processing circuit 43 and stores the image signal.

A first motor driver 47 drives a first motor 48 based on a control signal output from the control unit 41. The first motor 48 moves the main mirror 13 and the first reflection mirror 14 up and down. The first motor 48 also serves as a shutter-charge motor of the shutter 10.

A release switch 49 is used for starting the image capturing. An input/output terminal of the serial communication port of the control unit 41 is connected to the contact unit 28. The contact unit 28 is communicably connected to the interchangeable lens unit 2. An input/output terminal from the serial communication port of the control unit 41 is connected to the connection unit 29. The connection unit 29 is communicably connected to the flash unit 3. A shutter driving unit 50 is connected to an output terminal of the control unit 41 and drives the shutter 10.

The interchangeable lens unit 2 includes a lens control unit 51 which performs overall control of the interchangeable lens unit 2. The lens control unit 51 is a single chip microcomputer including an ALU, a ROM, a RAM, a timer, and a SPI.

A second motor driver 52 drives a second motor 53 to perform focus adjustment based on a control signal output from the lens control unit 51. Similarly, a third motor driver 54 drives a third motor 55 to control the diaphragm 31 based on a signal output from the lens control unit 51.

A distance encoder 56 is used for obtaining an extended amount of a focus adjustment lens. In other words, the distance encoder 56 is used for obtaining information of the object distance. The distance encoder 56 is connected to an input terminal of the lens control unit 51. If the interchangeable lens unit 2 is a zoom lens, a zoom encoder 57 is connected to an input terminal of the lens control unit 51 to acquire focal length information.

The contact unit 32 is communicably connected to the camera main body 1. An input/output terminal of the serial communication port of the lens control unit 51 is connected to the connection unit 29. When the interchangeable lens unit 2 is mounted on the camera main body 1, the contact unit 28 and the contact unit 32 are connected, and the control unit 41 and the lens control unit 51 can communicate with each other.

Optical information unique to the lens, which is necessary when the control unit 41 performs focus detection and exposure calculation, is sent from the lens control unit 51 to the control unit 41 via data communication. Further, object distance information and focal length information acquired by the distance encoder 56 and the zoom encoder 57 are also sent from the lens control unit 51 to the control unit 41 via data communication.

Further, focus adjustment information and diaphragm information acquired by the control unit 41 when the control unit 41 performs focus detection and exposure calculation are sent from the control unit 41 to the lens control unit 51 via data communication. The lens control unit 51 controls the second motor driver 52 according to the focus adjustment information, and controls the third motor driver 54 according to the diaphragm information. Such information is acquired from the control unit 41 via data communication.

The flash unit 3 includes a flash control unit 61 which performs overall control of the flash unit 3. The flash control unit 61 is a single chip microcomputer including an ALU, a ROM, a RAM, an A/D converter, a timer, and a SPI. A voltage booster 62 generates a high voltage of approximately 300 volts necessary for the flash of the light emitting unit 34, and charging is performed with the generated high voltage.

When the flash unit 3 is mounted on the camera main body 1, the connection unit 29 and the connection unit 38 are connected. Then, the control unit 41 and the flash control unit 61 can communicate with each other. The flash control unit 61 controls the voltage booster 62 according to the information obtained from the control unit 41 to perform flash start/stop of the light emitting unit 34. Further, the flash control unit 61 sends information of an amount of emitted light detected by the monitor sensor 37 to the control unit 41. Further, the flash light color information of the light emitting unit 34 is transmitted from the flash control unit 61 to the control unit 41.

Figure 5:
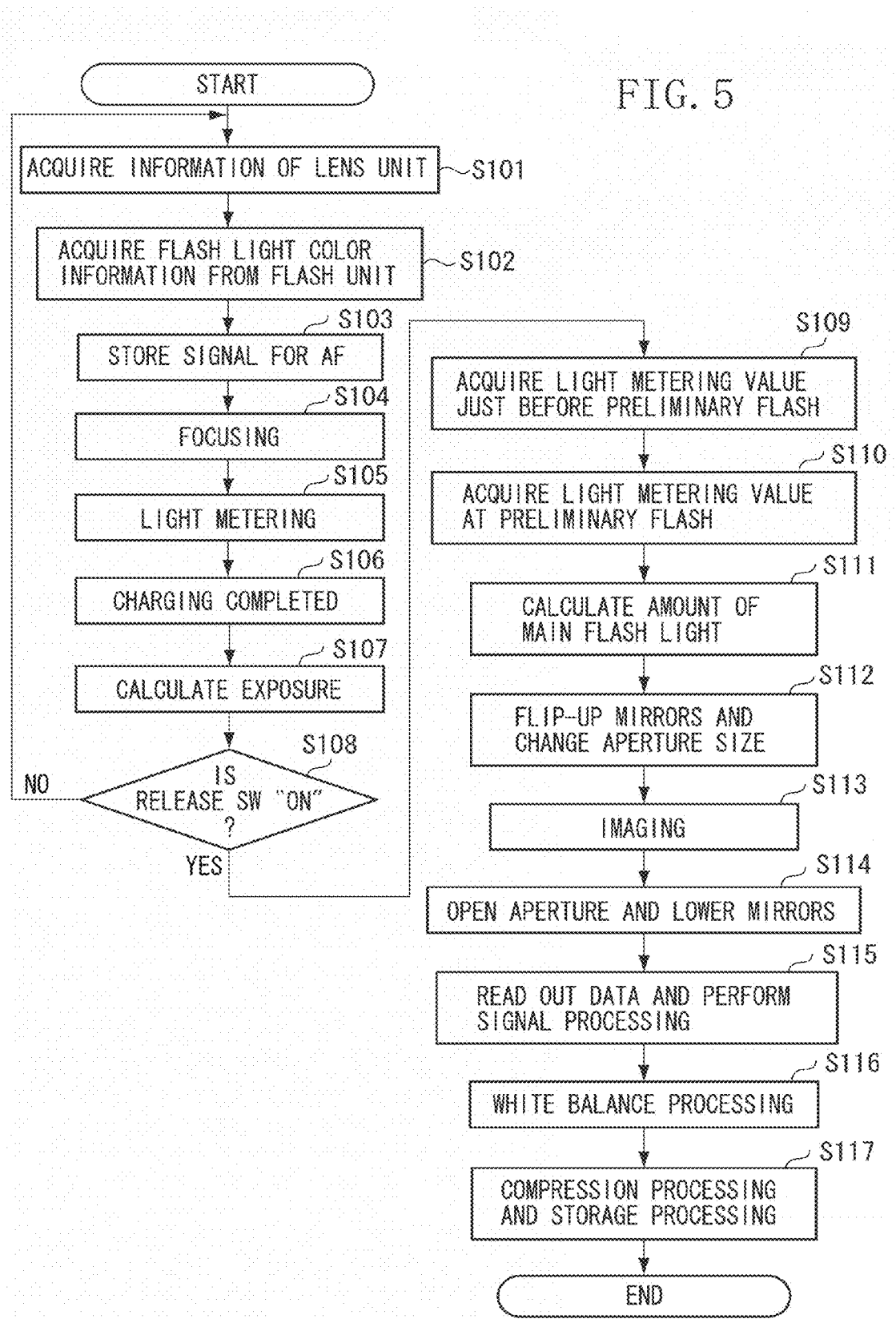
FIG. 5 is a flowchart illustrating various kinds of processing when performing flash imaging.

Next, processing of the flash imaging will be described with reference to the flowchart in FIG. 5. When a power switch (not illustrated) is turned on, the flowchart illustrated in FIG. 5 is started. In step S101, the control unit 41 communicates with the lens control unit 51 and acquires various types of information of the interchangeable lens unit 2 necessary in the focus adjustment and light metering processing.

In step S102, the control unit 41 instructs the flash control unit 61 to operate the voltage booster 62 so that sufficiently high charging voltage is obtained. Further, the control unit 41 communicates with the flash control unit 61 and acquires the flash light color information of the flash unit 3.

In step S103, the control unit 41 outputs a control signal to the focus detection sensor 20 to cause the focus detection sensor 20 to store signals. When the storage is completed, the control unit 41 performs A/D conversion of the signals stored in the focus detection sensor 20 while reading them out from the focus detection sensor 20. Further, the control unit 41 performs various types of correction processing such as a shading correction of the digital data which has been read out.

In step S104, based on various information of the interchangeable lens unit 2 acquired in step S101 and digital data obtained from the focus detection sensor 20, the control unit 41 calculates a focus state of focus detection regions on the imaging screen.

Next, the control unit 41 determines a focus detection region to be focused on out of the focus detection regions. Such a focus detection region can be determined by the photographer designating an arbitrary region using an operation member. Alternatively, the focus detection region can be determined by the control unit 41 based on a predetermined algorithm.

Then, the control unit 41 calculates the travel amount necessary in adjusting the focus state to the in-focus state according to the focus state of the determined focus detection region, and outputs the calculated information of the lens travel amount to the lens control unit 51. According to this information regarding the lens travel amount, the lens control unit 51 outputs a control signal to the second motor driver 52 to drive the second motor 53 to move the focus adjustment lens according to the control signal.

Through the focus adjustment operation, the object included in the determined focus detection region is brought into in-focus state. Since the information output from the distance encoder 56 is changed according to the drive of the focus adjustment lens, various types of information of the interchangeable lens unit 2 is also updated.

In step S105, the control unit 41 controls the timing generator 42 and performs a storage control and a signal read-out control of the signals stored in the light metering sensor 26. With this operation, the light metering sensor 26 stores signals for a predetermined length of time. Then, the control unit 41 sequentially reads out the stored signals of a plurality of pixels, performs A/D conversion, and stores the converted signals in the RAM.

The storage signal information of the light metering sensor 26 stored in the RAM is subjected to addition processing for each of R, G, and B colors for each of the light metering regions (PD1 to PD35). Accordingly, R(i), G(i), and B(i) are calculated. Further, R(i), G(i), and B(i) are subjected to matrix calculation using predetermined coefficients (M11 to M33). Accordingly, an object luminance value Br(i) in the linear system and object color information Cx(i) and Cy(i) are calculated for each light metering region.

$$\begin{pmatrix} Br(i) \\ Cx(i) \\ Cy(i) \end{pmatrix} = \begin{pmatrix} M11 & M12 & M13 \\ M21 & M22 & M23 \\ M31 & M32 & M33 \end{pmatrix} \times \begin{pmatrix} R(i) \\ G(i) \\ B(i) \end{pmatrix} \quad (1)$$

i=1 to 35

The object luminance value Br(i) in the linear system for each light metering region is further subjected to transformation function processing into a logarithmic compression system to the base 2 and correction processing S of luminance information of each screen area based on optical properties such as lens information. The object luminance information of the logarithmic compression system is referred to as an object luminance value B'(i).

$$B'(i)=\log_2\{Br(i)\}\times S(i)$$

i=1 to 35

In step S106, the control unit 41 communicates with the flash control unit 61 and determines whether a charging voltage is sufficient for the flashing. If the charging voltage is not sufficient for flashing, the charging is continued until the charging voltage is sufficient.

In step S107, the control unit 41 calculates the luminance information of the whole imaging screen according to a weighting calculation. According to this weighting calculation, the object luminance value B'(i) for each light metering region obtained in step S105 is weighted. Then, based on luminance information of the whole imaging screen calculated in this manner and a predetermined program diagram, the storage time of the image sensor 12 (shutter speed), the aperture value, and the photographic sensitivity are determined. These values are displayed on the display unit 45.

If any of the shutter speed, the aperture value, and the photographic sensitivity is designated in advance by the photographer and is preset, other parameters are determined to such values that can realize optimum exposure in combination with the preset value. In the following description, an exposure value which is determined based on apex values of the determined shutter speed and the aperture value is referred to as EVT. The exposure value EVT is acquired from the relational expression below.

$$EVT=Tv+Av$$

where Tv is an apex value of the shutter speed and Av is an apex value of the aperture value.

In step S108, the control unit 41 determines whether the release switch is "ON". If the release switch is "ON" (YES in step S108), the processing proceeds to step S109. If the release switch is "OFF" (NO in step S108), the processing returns to step S101.

In step S109, in order to perform the light metering without using the flash before the preliminary flash by the flash unit 3, the control unit 41 controls the timing generator 42 and performs a storage control and a read-out control of the signal stored in the light metering sensor 26.

With the control, the light metering sensor 26 stores charges for a predetermined length of time. Then, the control unit 41 sequentially reads out the stored signals of a plurality of pixels, performs A/D conversion, and stores the converted signals in the RAM. The signal information of the light metering sensor 26 stored in the RAM is subjected to addition processing for each of R, G, and B colors for each of the light metering regions (PD1 to PD35). Accordingly, Rp(i), Gp(i), and Bp(i) are calculated.

Further, Rp(i), Gp(i), and Bp(i) are subjected to matrix calculation using the predetermined coefficients (M11 to M33). Accordingly, an object luminance value Pr(i) just before the preliminary flashing in the linear system and object color information Cpx(i) and Cpy(i) are calculated for each light metering region.

$$\begin{pmatrix} Pr(i) \\ Cpx(i) \\ Cpy(i) \end{pmatrix} = \begin{pmatrix} M11 & M12 & M13 \\ M21 & M22 & M23 \\ M31 & M32 & M33 \end{pmatrix} \times \begin{pmatrix} Rp(i) \\ Gp(i) \\ Bp(i) \end{pmatrix} \quad (2)$$

i=1 to 35

The object luminance value Pr(i) just before the preliminary flash in the linear system for each light metering region is further subjected to transformation function processing into a logarithmic compression system to the base 2 and correction processing S of luminance information of each screen area based on optical properties such as lens information. The object luminance information of the logarithmic compression system is referred to as an object luminance value P(i) just before the preliminary flash.

$$P(i)=\log_2\{Pr(i)\}\times S(i)$$

i=1 to 35

In step S110, the control unit 41 communicates with the flash control unit 61 and instructs the flash control unit 61 to perform the preliminary flash prior to the main flash. Then, based on a signal output from the monitor sensor 37, the flash control unit 61 controls the light emitting unit 34 to emit a predetermined amount of flash light determined for the preliminary flash.

In order to obtain the light metering information of the object while the preliminary flash is performed, the control unit 41 controls the timing generator 42 to perform the predetermined storage control and the signal read-out control of the signals stored in the light metering sensor 26.

With this operation, signals are stored in the light metering sensor 26 for a predetermined time period, and the control unit 41 sequentially reads out the stored signals of a plurality of pixels, performs A/D conversion, and stores the converted signals in the RAM. The signal information of the light metering sensor 26 stored in the RAM is subjected to addition processing for each of R, G, and B colors for each of the light metering regions (PD1 to PD35). Accordingly, Rh(i), Gh(i), and Bh(i) are acquired.

Further, Rh(i), Gh(i), and Bh(i) are subjected to matrix calculation using predetermined coefficients (M11 to M33). Accordingly, an object luminance information Hr(i) at the preliminary flash of the linear system and object color information Chx(i) and Chy(i) at the preliminary flash is calculated for each light metering region.

$$\begin{pmatrix} Hr(i) \\ Chx(i) \\ Chy(i) \end{pmatrix} = \begin{pmatrix} M11 & M12 & M13 \\ M21 & M22 & M23 \\ M31 & M32 & M33 \end{pmatrix} \times \begin{pmatrix} Rh(i) \\ Ch(i) \\ Bh(i) \end{pmatrix} \quad (3)$$

i=1 to 35

The object luminance information Hr(i) at the preliminary flash of the linear system for each light metering region is further subjected to transformation function processing into a logarithmic compression system to the base 2 and correction processing S of luminance information of each screen area based on optical properties such as lens information. The object luminance information of the logarithmic compression system is referred to as an object luminance value H(i) at the preliminary flash.

$$H(i)=\log_2\{Hr(i)\}\times S(i)$$

i=1 to 35

In step S111, the control unit 41 calculates the amount of flash light when the imaging is performed (hereinafter referred to as the amount of main flash light). This calculation processing will be described below with reference to FIG. 6.

In step S112, the control unit 41 outputs a control signal to the first motor driver 47 to drive the first motor 48, Accordingly, the main mirror 13 and the first reflection mirror 14 flip up. Further, the control unit 41 outputs diaphragm information of the aperture value determined in step S107 to the lens control unit 51.

According to this diaphragm information, the lens control unit 51 outputs a control signal to the third motor driver 54 so that the third motor 55 drives the diaphragm 31. Accordingly, the aperture size of the diaphragm 31 is changed to a size corresponding to the aperture value determined in step S107.

In step S113, the control unit 41 outputs a control signal to the shutter driving unit 50 to open the shutter 10. Then, light is incident on the image sensor 12 via the imaging lens to enable image capturing. Then, the control unit 41 instructs the signal processing circuit 43 so that signals are stored in the image sensor 12 according to the storage time and the photographic sensitivity determined in step S107.

Further, the control unit 41 instructs the flash control unit 61 to flash at the moment when imaging is performed by the image sensor 12. According to the instruction by the control unit 41, the flash control unit 61 controls the light emitting unit 34 to flash an amount of flash light equal to the amount of main flash light acquired in step S111 based on the signal output from the monitor sensor 37. In this manner, imaging using the flash light of the flash unit 3 is performed.

When the imaging is completed, the control unit 41 outputs a control signal to the shutter driving unit 50. According to this signal, the shutter 10 is closed and the light incident on the image sensor 12 via the imaging lens is blocked.

In step S114, the control unit 41 instructs the lens control unit 51 to open the diaphragm 31. According to this instruction, the lens control unit 51 outputs a control signal to the third motor driver 54 to cause the third motor 55 to drive the diaphragm 31. Accordingly, the diaphragm 31 of the imaging lens is opened. Further, the control unit 41 outputs a control signal to the first motor driver 47 to drive the first motor 48. Accordingly, the main mirror 13 and the first reflection mirror 14 are flipped down.

In step S115, the control unit 41 instructs the signal processing circuit 43 to perform A/D conversion of the imaging signal output from the image sensor 12. The converted signal is further subjected to correction processing and interpolation processing.

In step S116, the control unit 41 instructs the signal processing circuit 43 to perform white balance adjustment of the image signal which has undergone the correction processing and the interpolation processing.

In step S117, the control unit 41 instructs the signal processing circuit 43 to compress the image signal which has undergone the white balance adjustment, and convert the signal into a recording file format. The acquired signal is stored in the storage unit 46.

Then, the various kinds of processing when the flash imaging is performed, are completed.

Next, calculation processing of the amount of main flash light in step S111 will be described with reference to the flowchart in FIG. 6.

In step S151, the control unit 41 calculates a luminance value D(i) of only the reflected light of a preliminary flash output from the flash unit 3 by using the object luminance value P(i) just before the preliminary flash and the object luminance value H(i) at the preliminary flash for each light metering region. Since the object luminance value P(i) just before the preliminary flash and the object luminance value H(i) at the preliminary flash are values in the compression system, they are raised and decompressed. Then, the difference is calculated, and the obtained value is calculated in logarithmic compression as follows:

$$D(i)=\log2(2H(i)-2P(i))$$

i=1 to 35

Further, object color information Ex(i) and Ey(i) of only the reflected light of the preliminary flash output from the flash unit 3 is calculated for each light metering region using the object color information Cpx(i) and Cpy(i) just before the preliminary flash and the object color information Chx(i) and Chy(i) at the preliminary flash.

$$Ex(i)=Chx(i)-Cpx(i)$$

$$Ey(i)=Chy(i)-Cpy(i)$$

i=1 to 35

In step S152, the control unit 41 calculates a luminance ratio R(i) for each light metering region by using the object luminance value P(i) just before the preliminary flash and the object luminance value H(i) at the preliminary flash.

$$R(i)=H(i)-P(i)$$

Since the object luminance value P(i) just before the preliminary flash and the object luminance value H(i) at the preliminary flash are values in the logarithmic compression system, obtaining the difference between the values is equivalent to obtaining a ratio of the luminance values.

By obtaining the ratio of the luminance values, the light metering regions (obtained by dividing the imaging screen into 35 areas) having the same ratio of the luminance values can be regarded that they are located at the same distance from the object.

In step S153, the control unit 41 calculates threshold values LVL0 and LVL1 based on information of the distance encoder 56 obtained from the lens control unit 51, in other words, object distance information D (hereinafter referred to as distance information D).

The threshold value LVL0 is calculated based on the distance information D obtained from the lens control unit 51 and information C2 of the amount of flash light at the preliminary flash and considering a luminance value of only the reflected light of the preliminary flash when an object of a standard reflectance is located at a distance expressed by the distance information D.

The threshold value LVL0 is determined so that it is slightly higher than the luminance value of only the reflected light of the preliminary flash when an object of a standard reflectance is located at a distance expressed by the distance information D. The reason for setting the threshold value LVL0 slightly higher is that the threshold value requires consideration of a small margin of error of the distance information D. By raising the threshold value LVL0 for a level that corresponds to such a margin, the luminance value of only the reflected light of the preliminary flash when an object of a standard reflectance actually exists is prevented from becoming higher than LVL0.

$$LVL0=-\log_2 D \times 2+C2$$

The threshold value LVL1 is determined by subtracting C3 from the threshold value LVL0. C3 is determined considering a possible error of the distance information D. Thus, the luminance value of only the reflected light of the preliminary flash when an object of a standard reflectance actually exists is prevented from becoming lower than the threshold value LVL1.

$$LVL1 = LVL0 - C3$$

The determination calculation of the amount of main flash light is performed where, as described above, the luminance value of only the reflected light of an object at the preliminary flash is between the threshold values LVL0 and LVL1.

In a case of the single-lens reflex type camera with an interchangeable lens, a distance encoder may not be included depending on the mounted lens. In such a case, the distance information D is not obtained. If the distance information D is not obtained, the threshold values LVL0 and LVL1 are determined as described below.

If a mounted interchangeable lens unit does not include a distance encoder, based on the focal length information of the imaging lens acquired in step S101, the threshold value LVL0 is determined according to table 1 illustrated in FIG. 8.

$$LVL0 = \text{table } 1(f)$$

For example, if the focal length of the imaging lens is 28 mm, a luminance value of only the reflected light of the preliminary flash when an object of a standard reflectance is located at a distance of 0.5 m is set as the threshold value LVL0. Generally, if an imaging lens of such a focal length is used, it is extremely unusual that imaging of an object at a distance shorter than 0.5 m is performed. Thus, the possibility of the luminance value of only the reflected light of the preliminary flash becoming lower than the threshold value LVL0 is high.

The rest of the components of table 1 in FIG. 8 is obtained in a same manner. If the imaging lens has a focal length of 50 mm, a luminance value of only the reflected light of the preliminary flash when an object of a standard reflectance is located at a distance of 0.8 m is set as the threshold value LVL0.

According to the present exemplary embodiment, the focal length of the photographic lens is given in a number of steps as illustrated in FIG. 8. The number and the range of the steps and the object distance assigned to each step are not limited to those illustrated in FIG. 8.

The threshold value LVL1 is determined by subtracting C1 from the threshold value LVL0. C1 is determined, based on an experimental rule, to such a value that the luminance value of only the reflected light of the preliminary flash is not lower than LVL1. For example, if flash imaging is performed using an imaging lens having a focal length of 50 mm, it is extremely unusual that imaging of an object located at a distance farther than 6.4 m is performed. Thus, the light reflected from the object with respect to the threshold value LVL0 can be set within the range of 6 steps. Accordingly, C1 is set to 6.

$$LVL1 = LVL0 - C1$$

where the threshold values LVL0 and LVL1 are both values in a logarithmic compression system.

In step S154, the control unit 41 sets an initial value to a coefficient K(i). Light metering regions from which the reference region described below is selected are determined according to the coefficient K(i). In the following description, such light metering regions are referred to as a target region. As illustrated in FIG. 7A, the coefficient K(i) is set to either 0 or 1 for each of the 35 light metering regions.

The initial value is 0 for the areas where the possibility of the existence of the main object when the normal imaging is performed is low. In FIG. 7B, the areas K(1) to K(8), K(14), K(15), K(21), K(22), K(28), K(29), and K(35), which are the marginal areas of the imaging screen, are set to 0, and other areas are set to 1.

In step S155, the control unit 41 compares the luminance value D(i) for each light metering region acquired in step S151 with the threshold values LVL0 and LVL1 determined in step S153. Then, the control unit 41 sets to 0 the coefficient K(i) of the light metering region where D(i)>LVL0 or D(i)<LVL1.

In this manner, the coefficient K(i) of a light metering region whose luminance value D(i) is very high due to, for example, regular reflection from an object having a mirror surface such as a glass is set to 0. Similarly, the coefficient K(i) of a light metering region whose luminance value D(i) is very low since the location of the reflector is so distant that the light emitted from the flash unit 3 is unable to reach the reflector is also set to 0. The light metering region set to the initial value in step S154 is set to 0 regardless of the luminance value D(i). Thus, it is not necessary to compare the luminance value D(i) and the threshold values LVL0 and LVL1.

In step 156, based on the flash light color information of the flash unit 3 acquired in step S102, the control unit 41 corrects a reference parameter for determination (hereinafter referred to as a reference parameter) being a particular condition used for determining a light metering region including a gilded folding screen. The reference parameter is stored in advance in the ROM.

There are four reference parameters used for determining the light metering region including a gilded folding screen. FIG. 10 illustrates the four parameters. Each value of the parameters is set based on a color range of a reflected light when a light of a standard flash color is emitted from a light emitting device to a gilded folding screen under normal flash conditions.

Since the color of the flash light emitted from the light emitting device changes according to the model and according to the flash condition, the reference parameter is corrected according to a value appropriate for the flash color in the flash light color information acquired from the mounted flash unit 3.

By correcting the parameters, even if the flash color is intentionally changed by a change in the flash light source or an attachment of a filter to the flash unit 3, the area including the gilded folding screen can be determined if flash light color information of the new color is acquired.

According to the exemplary present embodiment, although a method for correcting the reference parameters is described as an example of changing the reference parameters, if a plurality of reference parameters is stored in advance in a ROM, the reference parameter to be used may be changed based on the flash light color information of the flash unit 3.

In the following description, the reference parameters are denoted by Exmin, Exmax, Eymin, and Eymax. Further, parameters after the correction, which are data of the reference parameters after they are corrected, are denoted by Excmin, Excmax, Eycmin, and Eycmax.

Then, the parameters after the correction are compared with the object color information Ex(i) and Ey(i) of only the reflected light of the preliminary flash output from the flash unit 3 for each light metering region calculated in step S151. If the object color information Ex(i) and Ey(i) are in the range of the parameters after the correction, the area is regarded as the region including the gilded folding screen. In other words, even if a gilded folding screen is in the light metering region, if the ratio of the light metering region including the gilded folding screen is so small that the following conditions cannot be satisfied, the region is not regarded as an area including the gilded folding screen.

$Excmin \leq Ex(i) \leq Excmax$ $Eycmin \leq Ey(i) \leq Eycmax$

In step S157, the control unit 41 determines whether a light metering region including a gilded folding screen exists according to the comparison performed in step S156. If a light metering region including a gilded folding screen exists (YES in step S157), the processing proceeds to step S158. If a light metering region including a gilded folding screen does not exist (NO in step S157), the processing proceeds to step S159.

In step S158, the control unit 41 sets the coefficient K(i) of the light metering region including a gilded folding screen to 0. As for the light metering region where K(i) is set to 0 in step S154 or S155, since the coefficient is set to 0 regardless of whether a gilded folding screen is included. Thus, it is not necessary to perform the comparison in step S156. Further, if whether the light metering region includes a gilded folding screen is determined according to the comparison in step S156, and if the light metering region including the gilded folding screen is limited to the light metering region whose K(i) is set to 0 in step S154 or step S155, step S158 can be skipped.

Next, the determination of the coefficient K(i) in step S158 in a case where the imaging is performed under the imaging composition illustrated in FIG. 7C, will be described.

Figures 7C, 7D:
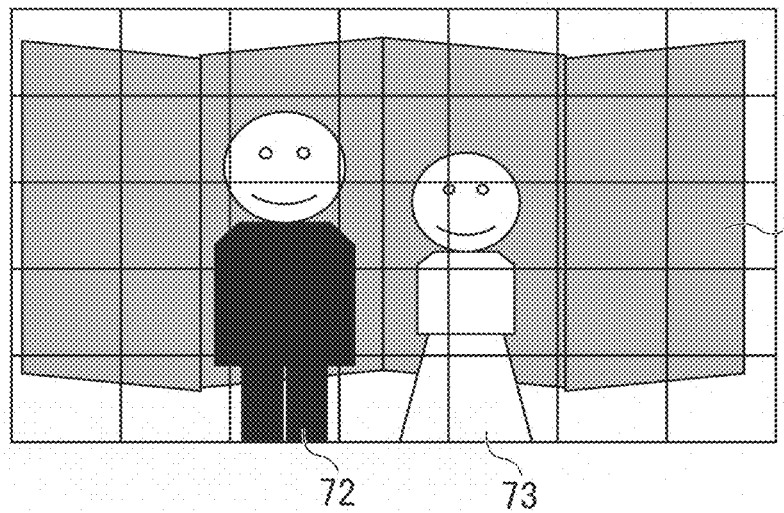

In FIG. 7C, a gilded folding screen 71 exists at the back of main objects 72 and 73. Therefore, the gilded folding screen is included in many of the 35 light metering regions. Thus, from PD1 to PD9, PD11, PD13 to PD16, PD18, PD20 to PD23, PD27, and PD28 from which the color information of the gilded folding screen is acquired, object color information Ex(i) and Ey(i), which indicate that the light is reflected from a gilded folding screen, are acquired. If the coefficient K(i) for each of the light metering regions is also changed to 0, the light metering regions will be as illustrated in FIG. 7D. In this manner, the target region from which the reference region is selected is determined.

In step S159, the control unit 41 selects a light metering region with the greatest luminance ratio R(i) out of the light metering regions whose K(i) is 1, and sets it as the reference region. As described above, the light metering regions whose K(i) is 1 are where the possibility of the regions including the main object is high. Out of such regions, the light metering region with the greatest R(i) is the area which can have the highest probability of including the main object.

In step S160, the control unit 41 calculates a difference RR(i), which is a difference between the luminance ratio R(i) and the reference value baseR of each of the 35 light metering regions.

$RR(i) = baseR - R(i)$

Since the luminance ratio R(i) and the reference value baseR are both values in the logarithmic compression system, the difference RR(i) is a ratio of the luminance ratio R(i) of the reference region to the luminance ratio R(i) of other light metering regions. The light metering region with a small value of the difference RR(i) is a light metering region where an object exists at a distance substantially similar to the distance of the object in the reference region.

The light metering region with a greater value of the difference RR(i) in the positive direction is a light metering region where an object exists at a distance substantially farther than the distance of the object in the reference region. On the other hand, the light metering region with a greater value of the difference RR(i) in the negative direction is a light metering region where an object exists at a distance substantially closer than the distance of the object in the reference region.

In step S161, the control unit 41 determines a weighting coefficient W(i) based on the difference RR(i) which has been determined for each of the 35 light metering regions. To be more precise, the weighting coefficient W(i) is determined according to the difference RR(i) of the light metering region illustrated in table 2 in FIG. 9.

$W(i) = \text{table 2}(RR(i))$

According to table 2, the weighting coefficient W(i) increases the closer the difference RR(i) is to 0 and the weighting coefficient W(i) decreases the larger the absolute value of the difference RR(i) is. In other words, the weighting of the reference region is the largest. As described above, the light metering region whose value of the difference RR(i) is close to 0 is a light metering region where an object is at a distance similar to the distance of the object in the reference region. Thus, the possibility of the light metering region being a region including an object similar to the object in the reference region or an object having a similar importance compared to the object in the reference region is high.

On the other hand, the light metering region whose absolute value of the difference RR(i) is large is a light metering region where an object is at a distance greatly different from the distance of the object in the reference region. Thus, the possibility of the light metering region being a region including an object having a similar importance compared to the object in the reference region is low. According to the above-described method, even if the light metering region is a light metering region whose coefficient K(i) has been set to 0 and thus excluded from the target region in steps S154 to S158, if the value of the difference RR(i) is close to 0, the weighting coefficient W(i) will be increased.

Therefore, a substantially similar amount of main flash light is calculated for a case where the location of the main object is moved in the imaging screen each time the imaging is performed or the same scene with a slightly different composition is captured. Thus, photographs of similar exposure can be obtained and thus stable imaging result can be acquired.

The light reflected from a gilded folding screen greatly changes according to its angle with respect to the imaging apparatus or the light emitting device. Thus, the luminance value D(i) of the reflected light of a flash output from the flash unit 3 greatly changes. Even if a region is determined as a light metering region including a gilded folding screen according to the object color information, if the amount of reflected light of the light emitted from the flash unit is small, a good image can be obtained even if the value of the difference RR(i) is close to 0 and the weighting coefficient W(i) is high.

In step S162, the control unit 41 performs the weighting calculation of the luminance value D(i) of each light metering region using the weighting coefficient W(i) determined in step S161.

$AVE = \Sigma(D(i) \times W(i))/\Sigma W(i)$

According to this weighting calculation, a weighted average AVE of the luminance values of only the reflected light of a preliminary flash output from the flash unit 3 of the whole imaging screen is calculated.

In step S163, the control unit 41 calculates main flash light amount information G using the exposure value EVT determined in step S107 and the weighted average AVE calculated in step S161.

$G = EVT - AVE$

As seen from the formula above, the main flash light amount information G indicates a relative value of the amount of flash light with respect to the amount of flash light when the preliminary flash is performed. Substantially, it indicates information of the amount of main flash light. The calculated main flash light amount information G is transmitted to the flash control unit 61 from the control unit 41. In step S113, the main flash of the flash unit 3 is performed according to the information of the main flash light amount information G.

As described above, if a gilded folding screen is included in the imaging screen, the light metering region including the gilded folding screen is excluded from the target region from which the reference region is selected when the calculation of the amount of main flash light is performed. In this manner, appropriate amount of flash light for the main object which the photographer intends to capture, can be calculated. Accordingly, an appropriate image can be obtained even if a gilded folding screen is included in the imaging screen.

The present invention is not limited to the above-described exemplary embodiment, and various changes and modifications can be applied so long as they fall within the scope of the present invention.

For example, according to the above-described exemplary embodiment, a light metering region including the gilded folding screen is determined according to the object color information acquired at the preliminary flash of the flash unit 3 in step S156 in FIG. 6. This is because, the light source that emits the strongest light to the gilded folding screen can be identified by the emission of the light of the flash unit 3, and whether a gilded folding screen exists can be determined more easily.

However, if the color of the object can be detected without being affected by the color of the light source, object color information obtained from a light other than the preliminary flash of the flash unit 3 can be used for the determination of the light metering region including the gilded folding screen.

Further, according to the above-described exemplary embodiment, the reference parameter used for determining the light metering region that includes a gilded folding screen by the flash light color information transmitted from the flash unit 3 is corrected in step S156 in FIG. 6.

However, the object color information Ex(i) and Ey(i) of only the reflected light of the preliminary flash output from the flash unit 3 can be corrected by using the flash light color information of the flash unit 3, and the obtained result can be compared with the reference parameters Exmin, Exmax, Eymin, and Eymax. Further, the predetermined coefficients (M11 to M33) used for calculating the object color information Ex(i) and Ey(i) of only the reflected light of the preliminary flash output from the flash unit 3 can be corrected.

Although a light metering region including a gilded folding screen is excluded from the target region from which the reference region is selected in the above-described exemplary embodiment, a light metering region including a different type of highly-reflective object can be excluded from the target region so long as the highly-reflective object has characteristics similar to those of the gilded folding screen.

Further, although a gilded folding screen has been used as an example of an object having a gold color according to the exemplary embodiment described above, a golden object other than the gilded folding screen can also be used. The reference parameters of the above-described exemplary embodiment can be set based on a color range of a light reflected from a golden object when light is emitted to the object.

Further, in selecting the reference region, since a light metering region other than the light metering region whose color information satisfies a particular condition can be selected preferentially, the light metering region whose color information satisfies a particular condition is not necessarily excluded from the target region from which the reference region is selected.

Further, although whether a light metering region that satisfies a certain condition exists is determined based on color information, the color information can be luminance-considered information. If the color information is luminance-considered information, light metering region including the light reflective object can be determined more accurately.

According to the above-described exemplary embodiment, the light metering sensor 26 is used as a sensor for acquiring the luminance information (light metering value) and the color information.

However, two sensors, a luminance information acquisition sensor and a color information acquisition sensor, can be used in place of the light metering sensor 26. Further, when one sensor is used for acquiring the luminance information and the color information, the image sensor 12 can be used in place of the light metering sensor 26 for acquiring the luminance information and the color information of the object.

Further, the flash control unit 61 of the flash unit 3 can execute a portion of the processing regarding calculation of the amount of main flash light described above in the exemplary embodiment. The processing regarding calculation of the amount of main flash light is processing for determining the weighting coefficient with respect to a plurality of light metering regions, processing for selecting a reference region used in determining the weighting coefficient, and processing for calculating the amount of main flash light.

Further, the flash unit 3 can include the sensor for acquiring the luminance information and the color information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-113911 filed May 20, 2011, which is hereby incorporated by reference herein in its entirety.

What is claimed is:

1. An imaging apparatus capable of imaging using a light emitting device, the apparatus comprising:
    a light metering value acquisition unit configured to acquire a plurality of light metering values corresponding to each of a plurality of light metering regions;
    a color information acquisition unit configured to acquire a plurality of pieces of color information corresponding to each of the plurality of light metering regions;
    a determination unit configured to determine a weighting coefficient of each of the plurality of light metering regions;
    a calculation unit configured to calculate an amount of main flash light after performing weighting of the light metering value of each of the plurality of light metering regions according to the weighting coefficient determined by the determination unit; and
    a selection unit configured to select, from the plurality of light metering regions, a reference region which is used when the weighting coefficient of each of the plurality of light metering regions is determined by the determination unit, wherein the selection unit selects the reference region in such a manner that a light metering region different from a light metering region whose color information acquired by the color information acquisition unit satisfies a condition indicating gold is preferentially selected.

2. A light emitting device comprising:
a light metering value acquisition unit configured to acquire a plurality of light metering values respectively corresponding to a plurality of light metering regions;
a color information acquisition unit configured to acquire a plurality of pieces of color information corresponding to each of the plurality of light metering regions;
a determination unit configured to determine a weighting coefficient of each of the plurality of light metering regions;
a calculation unit configured to calculate an amount of main flash light after performing weighting of the light metering value of each of the plurality of light metering regions according to the weighting coefficient determined by the determination unit; and
a selection unit configured to select, from the plurality of light metering regions, a reference region which is used when the weighting coefficient of each of the plurality of light metering regions is determined by the determination unit;
wherein the selection unit selects the reference region in such a manner that a light metering region different from a light metering region whose color information acquired by the color information acquisition unit satisfies a condition indicating gold is preferentially selected.

3. An imaging system including an imaging apparatus and a light emitting device, the system comprising:
a light metering value acquisition unit configured to acquire a plurality of light metering values respectively corresponding to a plurality of light metering regions;
a color information acquisition unit configured to acquire a plurality of pieces of color information corresponding to each of the plurality of light metering regions;
a determination unit configured to determine a weighting coefficient of each of the plurality of light metering regions;
a calculation unit configured to calculate an amount of main flash light of the light emitting device after performing weighting of the light metering value of each of the plurality of light metering regions according to the weighting coefficient determined by the determination unit; and
a selection unit configured to select, from the plurality of light metering regions, a reference region which is used when the weighting coefficient of each of the plurality of light metering regions is determined by the determination unit,
wherein the selection unit selects the reference region in such a manner that a light metering region different from a light metering region whose color information acquired from the color information acquisition unit satisfies a condition indicating gold is preferentially selected.

4. A control method of an amount of a flash light of a light emitting device, the method comprising:
acquiring a plurality of light metering values respectively corresponding to a plurality of light metering regions;
acquiring a plurality of pieces of color information corresponding to each of the plurality of light metering regions;
determining a weighting coefficient of each of the plurality of light metering regions;
calculating an amount of main flash light of the light emitting device after performing weighting of the light metering value of each of the plurality of light metering regions according to the determined weighting coefficient; and
selecting, from the plurality of light metering regions, a reference region which is used when the weighting coefficient of each of the plurality of light metering regions is determined;
wherein the reference region is selected in such a manner that a light metering region different from a light metering region whose acquired color information satisfies a condition indicating gold is preferentially selected.

5. An imaging apparatus capable of imaging using a light emitting device, the apparatus comprising:
a light metering value acquisition unit configured to acquire a plurality of light metering values corresponding to each of a plurality of light metering regions;
a color information acquisition unit configured to acquire a plurality of pieces of color information corresponding to each of the plurality of light metering regions;
a determination unit configured to determine a weighting coefficient of each of the plurality of light metering regions;
a calculation unit configured to calculate an amount of main flash light after performing weighting of the light metering value of each of the plurality of light metering regions according to the weighting coefficient determined by the determination unit; and
a selection unit configured to select, from the plurality of light metering regions, a reference region which is used when the weighting coefficient of each of the plurality of light metering regions is determined by the determination unit,
wherein the selection unit selects the reference region in such a manner that, based on the color information acquired from the color information acquisition unit by performing a preliminary flash of the light emitting device, a light metering region different from a light metering region whose color information acquired by the color information acquisition unit satisfies a particular condition is preferentially selected,
wherein the selection unit changes the particular condition based on flash light color information of the preliminary flash of the light emitting device.

6. A light emitting device comprising:
a light metering value acquisition unit configured to acquire a plurality of light metering values respectively corresponding to a plurality of light metering regions;
a color information acquisition unit configured to acquire a plurality of pieces of color information corresponding to each of the plurality of light metering regions;
a determination unit configured to determine a weighting coefficient of each of the plurality of light metering regions;
a calculation unit configured to calculate an amount of main flash light after performing weighting of the light metering value of each of the plurality of light metering regions according to the weighting coefficient determined by the determination unit; and
a selection unit configured to select, from the plurality of light metering regions, a reference region which is used when the weighting coefficient of each of the plurality of light metering regions is determined by the determination unit,
wherein the selection unit selects the reference region in such a manner that, based on the color information acquired from the color information acquisition unit by performing a preliminary flash of the light emitting device, a light metering region different from a light metering region whose color information acquired by the color information acquisition unit satisfies a particular condition is preferentially selected, wherein the selection unit changes the particular condition based on flash light color information of the preliminary flash of the light emitting device.

7. An imaging system including an imaging apparatus and a light emitting device, the system comprising:
   a light metering value acquisition unit configured to acquire a plurality of light metering values respectively corresponding to a plurality of light metering regions;
   a color information acquisition unit configured to acquire a plurality of pieces of color information corresponding to each of the plurality of light metering regions;
   a determination unit configured to determine a weighting coefficient of each of the plurality of light metering regions;
   a calculation unit configured to calculate an amount of main flash light of the light emitting device after performing weighting of the light metering value of each of the plurality of light metering regions according to the weighting coefficient determined by the determination unit; and
   a selection unit configured to select, from the plurality of light metering regions, a reference region which is used when the weighting coefficient of each of the plurality of light metering regions is determined by the determination unit,
   wherein the selection unit selects the reference region in such a manner that, based on the color information acquired from the color information acquisition unit by performing a preliminary flash of the light emitting device, a light metering region different from a light metering region whose color information acquired by the color information acquisition unit satisfies a particular condition is preferentially selected,
   wherein the selection unit changes the particular condition based on flash light color information of the preliminary flash of the light emitting device.

8. A control method of an amount of a flash light of a light emitting device, the method comprising:
   acquiring a plurality of light metering values respectively corresponding to a plurality of light metering regions;
   acquiring a plurality of pieces of color information corresponding to each of the plurality of light metering regions;
   determining a weighting coefficient of each of the plurality of light metering regions;
   calculating an amount of main flash light of the light emitting device after performing weighting of the light metering value of each of the plurality of light metering regions according to the determined weighting coefficient; and
   selecting, from the plurality of light metering regions, a reference region which is used when the weighting coefficient of each of the plurality of light metering regions is determined,
   wherein the reference region is selected in such a manner that a light metering region different from a light metering region whose acquired color information satisfies a particular condition is preferentially selected,
   wherein the particular condition is changed based on flash light color information of the preliminary flash of the light emitting device.

9. The imaging apparatus according to claim 1, wherein the color information acquired by the color information acquisition unit is information including luminance related information.

10. The imaging apparatus according to claim 1, wherein the selection unit selects the reference region in such a manner that, based on the color information acquired from the color information acquisition unit by performing a preliminary flash of the light emitting device, a light metering region different from a light metering region whose color information acquired by the color information acquisition unit satisfies the particular condition is preferentially selected.

11. The imaging apparatus according to claim 10, further comprising a changing unit configured to change the particular condition based on flash light color information of the preliminary flash of the light emitting device.

12. The imaging apparatus according to claim 1, wherein the determination unit maximizes the weighting coefficient of the reference region out of the weighting coefficients of the plurality of light metering regions.

13. The imaging apparatus according to claim 1, wherein the determination unit assigns a greater weighting coefficient for a light metering region whose ratio of the light metering value acquired from the acquisition unit without flashing the light emitting device to the light metering value acquired from the acquisition unit by performing a preliminary flash of the light emitting device, is closer to that of the reference region.

14. The imaging apparatus according to claim 1, wherein the light metering value and the color information are acquired based on a signal output from a same sensor.

15. The imaging apparatus according to claim 5, wherein the selection unit selects the reference region in such a manner that a light metering region other than a light metering region where a highly-reflective object is likely to be existing is preferentially selected based on color information acquired by the color information acquisition unit.

16. The imaging apparatus according to claim 5, wherein the color information acquired by the color information acquisition unit is information including luminance related information.

17. The imaging apparatus according to claim 5, wherein the determination unit maximizes the weighting coefficient of the reference region out of the weighting coefficients of the plurality of light metering regions.

18. The imaging apparatus according to claim 5, wherein the determination unit assigns a greater weighting coefficient for a light metering region whose ratio of the light metering value acquired from the acquisition unit without flashing the light emitting device to the light metering value acquired from the acquisition unit by performing a preliminary flash of the light emitting device, is closer to that of the reference region.

19. The imaging apparatus according to claim 5, wherein the light metering value and the color information are acquired based on a signal output from a same sensor.

* * * * *